United States Patent Office

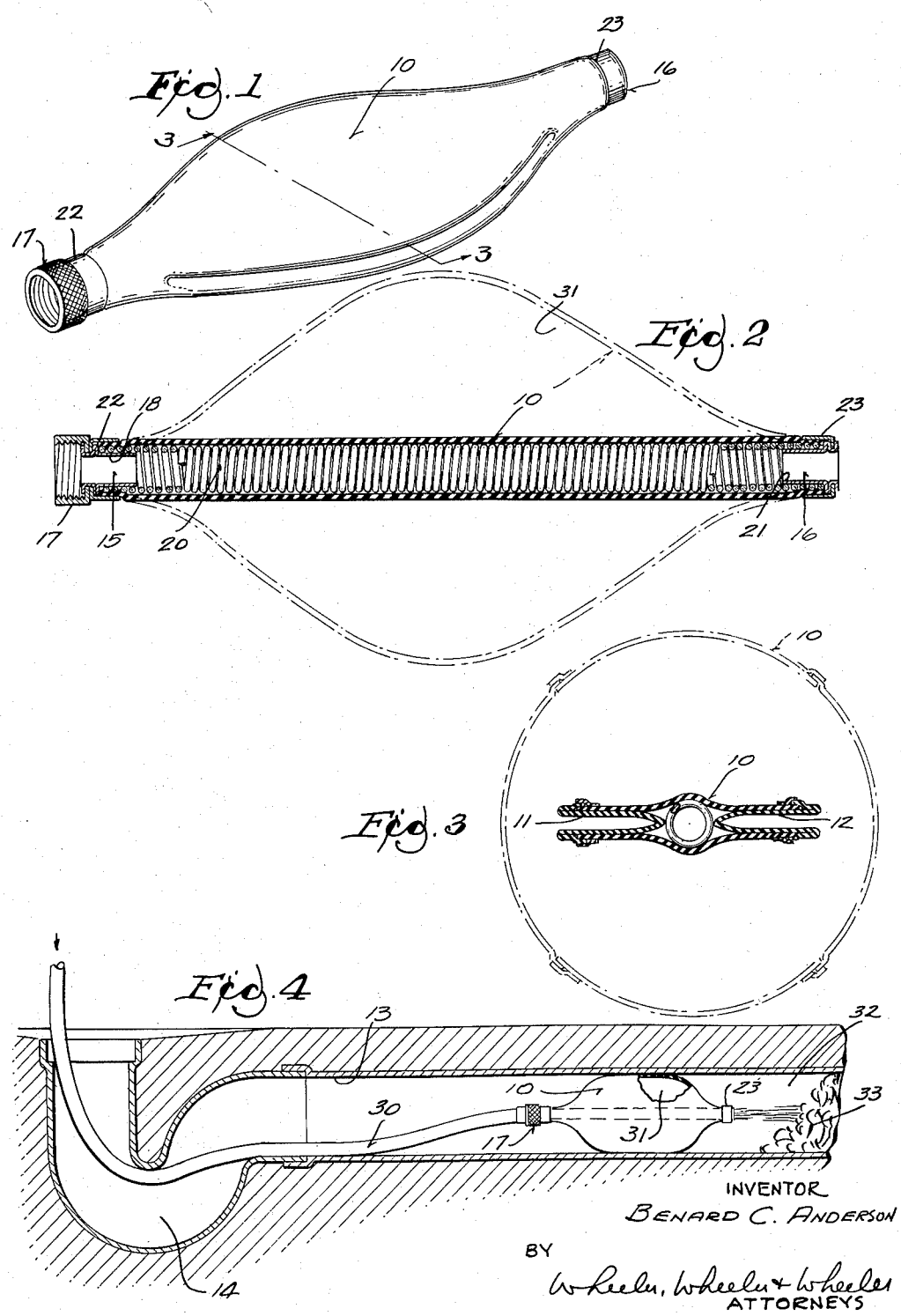

3,086,540
Patented Apr. 23, 1963

3,086,540
WATER PRESSURE BULB UNIT FOR
UNCLOGGING DRAINS
Benard C. Anderson, 3103 14th Ave., Kenosha, Wis.
Filed Apr. 19, 1962, Ser. No. 188,700
5 Claims. (Cl. 134—167)

This invention relates to improvements in a pressure bulb unit for clearing clogged drains.

Many devices have heretofore been provided to isolate, hydraulically, a section of a clogged drain so that hydraulic pressure may be built up between the expansible unit and the foreign material which clogs the drain. Then the continued injection of water under pressure into the isolated portion of the drain applies sufficient pressure to force the foreign material along the drain until the drain is cleared. However, in the prior art, each of the known expansible devices has been lacking in important particulars and I have discovered that an expansible bulb unit as shown in my drawings and described below meets the requirements and provides a singularly satisfactory working tool.

One of the important requirements is the provision not only of an elastic and flexible envelope which may be given expansible bulbous configuration, but also may be so equipped as to have a flexible central "core" which will maintain sufficient stability of the dimensions of the envelope as to be advanceable and directable into and through the traps and drain pipes which are to be serviced. Furthermore, there must be sufficient stability with respect to the envelope so that if it is accidentally separated from the hose connections which provide it with fluid pressures, there will be sufficient body to be retrieved through the use of the various retrieving instruments known to the plumbing trade.

Another feature of my invention which is of importance is the establishment and maintenance of a bulbous isolator for a portion of a clogged drain which may be maintained at sufficient internal envelope pressure to locate the unit positively in a drain and still provide for jet of fluid to be projected into and against the foreign matter in the drain with sufficient force to turbulate and remove such foreign matter.

In the drawings:

FIGURE 1 is a perspective view of my unit for clearing clogged drains.

FIGURE 2 is a longitudinal section through my pressure bulb unit; the elastic envelope of the unit being shown in partially inflated condition.

FIGURE 3 is a section through a pipe to be serviced and showing my collapsed unit centrally of such pipe, the section with respect to my unit being approximately on line 3—3 of FIGURE 1.

FIGURE 4 is a section showing a drain pipe and trap with my unit and a hose connection thereto inserted in the clogged drain, my unit and the hose being shown in elevation.

My pressure bulb unit 10 for clearing clogged drains comprises a rubber-like envelope of generally oval configuration as shown in FIGS. 1 and 2, but having convolutions of the side walls 11 and 12 thereof collapsible to the position shown in FIGURE 3 so that when the envelope is to be projected into a pipe, a configuration as shown in FIGURE 1 is projectable into a drain such as that shown at 13 even though the envelope must travel through a trap such as that shown at 14 in FIG. 4. To provide the most satisfactory degree of elasticity and flexibility, an elastomeric material such as rubber or synthetic rubber is preferred.

At spaced locations and extending respectively through the wall of envelope 10 are the conduit-like thimbles 15 and 16. These provide access and jet relief respectively of fluid which is to be passed into, through, or from the envelope 10. The thimble 15 will be recognized immediately as a typical female hose connection 17, but in this instance, in the formation of my expansible resilient bulb unit, the external diameter of the portion 18 of the thimble 15 is such as to be received externally snugly within a cylindrically, helically wound spring wire "tube" 20.

Likewise the external diameter of that part of thimble 16 which protrudes into the interior of the envelope 10 at 21 is such as to be very snugly received within the spring wire tube 20. A relatively small hole in the end of envelope 10 is expanded to receive the portion 18 of hose fitting 17 and the helically wound wire tube 20 as shown in FIG. 2 and the usual ferrule 22 forming a part of the hose fitting 17 compressively seals and binds the envelope permanently in position about thimble 15. Then at the other end of the unit 10, a similar ferrule 23 compressively bonds the envelope and the spring wire tube upon thimble 16 in such a way as to provide a water tight and permanent connection between the thimble 16 and the envelope.

It is important to note that in accord with my invention, the internal diameters of the thimble 15 and the internal diameter of the thimble 16 are, for all practical purposes, identical; and the size of the parts as shown in FIGURE 2 are to scale—the thimbles 15 and 16 being half inch pipe size, the envelope being approximately the thickness of rubber or synthetic rubber used for the bladders of footballs, and the wire for the helically wound wire tube 20 being one-eighth inch diameter spring wire sufficiently tempered to readily enable the tube 20 to follow the convolutions of the trap 14 in a usual floor drain or toilet connection and yet stable enough to maintain its directional insertion through such a trap and along a pipe 13.

Experience has shown that my expansible resilient bulb unit 10, when inserted into a pipe such as that shown in FIGURE 4 and when connected to the usual city water of 40 to 80 pounds of pressure as supplied from hose connection 30 of typical garden hose characteristics will be expanded by the fluid pressure even though the internal diameter of the thimbles 15 and 16 is identical as above set forth. This means that the "leakage" between the convolutions of the spring wire tube 20 is such, because of the water going through the tube 20 that ample pressure is developed in the zone 31 outside of tube 20, to force the envelope 10 into the configuration shown in FIGURE 4, and to provide the pressure and friction against the walls of the pipe 13 whereby to locate my bulb unit so positively that fluid pressure in the zone 32 "ahead of the unit will not push the unit toward the left as seen in FIGURE 4.

In use, my resilient bulb unit has been found to be readily receivable into a pipe such as that shown at 13—14 in FIGURE 4 because the cylindrically, helically wound wire tube 20 is form sustaining with respect to envelope 10 and in combination with the form sustaining nature of the typical garden hose 30 can be pushed into a pipe so as to isolate the zone 32 between my unit and any foreign matter in the pipe which is to be dislodged. Immediately upon the application of fluid pressure through the hose 30 to the unit, the unit assumes the general configuration shown in FIGURE 4 and accomplishes the isolation referred to above. As soon as this fluid isolation of the zone 32 is established, pressure builds up in accord with the pressure available through the hose 30, and the foreign matter at 33 is forced along the drain.

In the event that an accident occurs to puncture the elastic envelope 10, all parts of the envelope are secured to one or another thimble 15 or 16, and the thimbles are secured to the spring wire tube 20 to provide ample basis for retrieval for all of my unit merely by withdrawal of the hose 30; and if an accident ruptures or severs hose 30, the sustaining stable form of my unit as prescribed by tube 20 facilitates the retrieval of my unit through the use of any of the retrieval tools available in the plumber's tool kit.

I claim:

1. An expansible resilient bulb unit comprising an envelope of flexible, elastic fluid impermeable material, means comprising a hollow thimble bonded in sealing relation to the envelope and extending therethrough to provide for supply and exit of fluid to the interior of the envelope, a second hollow thimble extending through the envelope in spaced relation to the first mentioned thimble, and a cylindrical helically wound spring disposed between said thimbles and secured to each in position to complete a non-fluid tight tube therebetween whereby to physically provide a degree of physical shape stability of the unit greater than that provided by the flexible elastic material thereof.

2. The unit of claim 1 wherein the thimbles have equal tubular internal diameter.

3. The unit of claim 1 wherein the envelope is elongated in form between said thimbles and said cylindrical helically wound spring comprises wire in helical convolutions closely adjacent one another whereby fluid entering said first mentioned thimble is turbulated in its passage toward the last mentioned thimble.

4. An elastic fluid impermeable walled envelope having a hose connection extended through the envelope in sealed relation thereto and comprising a tubular fluid conduit, a portion of said conduit protruded into the envelope to provide fluid access to the interior of the envelope, a second tubular conduit in sealed relation to the envelope and protruded thereinto, a resilient, cylindrically, helically wound spring wire received upon said protruded conduits and extended therebetween whereby to provide a resilient fluid permable conduit for passage of fluid through and into said envelope and a flexible hose connection connected to said first mentioned conduit.

5. The elements of claim 4 provided with a ferrule for each tubular conduit positioned to compress the wall of the envelope upon the cylindrical spring wire and compress said wire respectively upon the conduits.

References Cited in the file of this patent

UNITED STATES PATENTS

| | | |
|---|---|---|
| 1,845,442 | Robinson | Feb. 16, 1932 |
| 2,413,997 | Rosa | Jan. 7, 1947 |
| 2,753,876 | Kurt | July 10, 1956 |